O. S. SLEEPER.
DISCHARGE VALVE.
APPLICATION FILED SEPT. 6, 1907.
920,201.
Patented May 4, 1909.
2 SHEETS—SHEET 1.
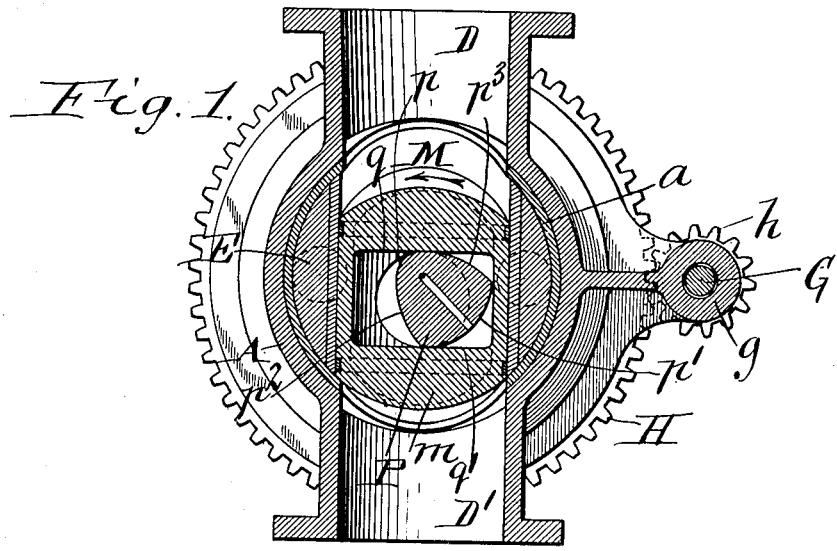
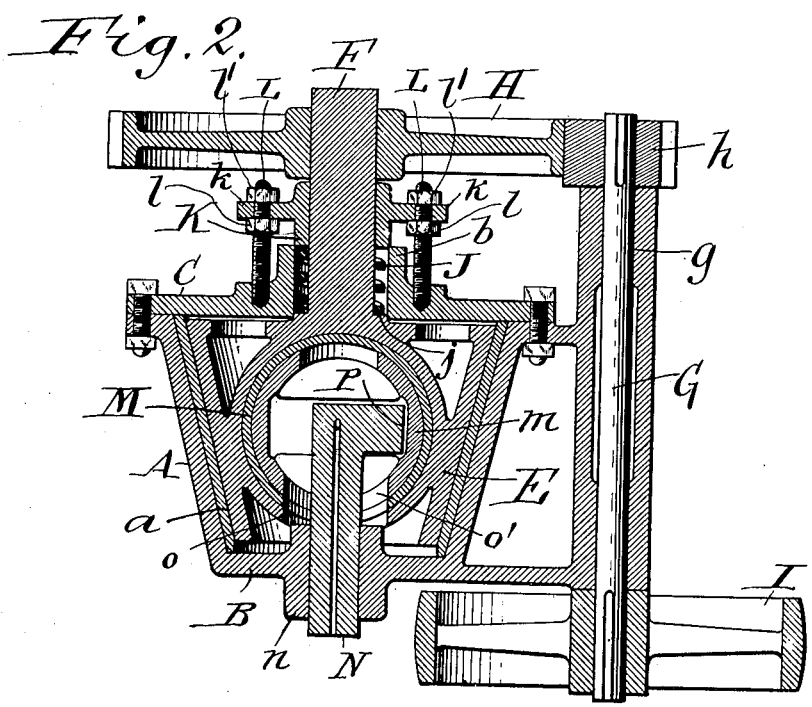
Witnesses:
Gustav W. Horn.
Richard Sommer.
Inventor
Oliver S. Sleeper
by Sever & Popp
Attorneys.

O. S. SLEEPER.
DISCHARGE VALVE.
APPLICATION FILED SEPT. 6, 1907.
920,201.
Patented May 4, 1909.
2 SHEETS—SHEET 2.
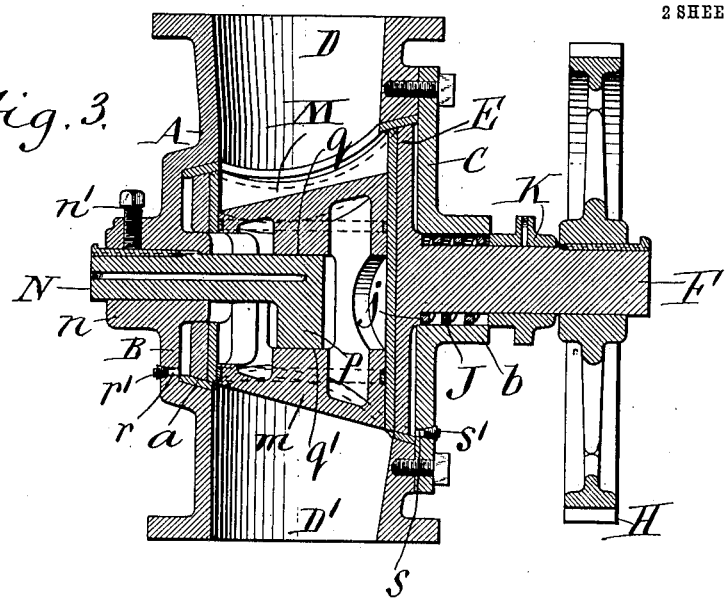
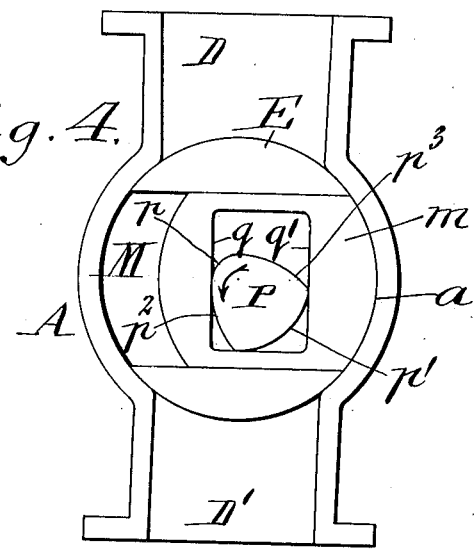

UNITED STATES PATENT OFFICE.

OLIVER S. SLEEPER, OF BUFFALO, NEW YORK, ASSIGNOR TO BUFFALO FOUNDRY COMPANY, OF BUFFALO, NEW YORK, A CORPORATION OF NEW YORK.

DISCHARGE-VALVE.

No. 920,201.   Specification of Letters Patent.   Patented May 4, 1909.

Application filed September 6, 1907. Serial No. 391,543.

*To all whom it may concern:*

Be it known that I, OLIVER S. SLEEPER, a citizen of the United States, residing at Buffalo, in the county of Erie and State of New York, have invented a new and useful Improvement in Discharge-Valves, of which the following is a specification.

The object of this invention is the production of an improved valve for the discharge or outlet of a continuous vacuum drier although the same may also be used for other purposes.

In the accompanying drawings consisting of 2 sheets:—Figure 1 is a vertical transverse section of my improved discharge valve. Fig. 2 is a horizontal section thereof. Fig. 3 is a vertical longitudinal section thereof. Fig. 4 is a diagrammatic view similar to Fig. 1 showing another position of the plug and piston.

Similar letters of reference indicate corresponding parts throughout the several views.

The body or casing A of the valve preferably has the form of a horizontal cone and is provided with a conical valve seat $a$. The small end of the casing is closed by a fixed head B and its large end is closed by a removable head C. The inlet D of the valve casing is at its top and the outlet $D^1$ at the bottom thereof.

Within the valve seat rotates the conical valve plug E which is provided at its large end with a central outwardly projecting stem or shank F. The plug is rotated by means of a driving shaft G journaled parallel with the axis of the plug in a bearing $g$ at the side of the casing, a pinion $h$ arranged on one end of the driving shaft and meshing with a gear wheel H on the plug stem, and a driving pulley I arranged on the other end of the driving shaft. The plug is constantly pressed toward the small end of the valve seat by a spring J surrounding the shank within a hub $b$ on the head B and bearing at its inner end against a shoulder $j$ on the plug, a gland or collar K sliding on the shank and bearing against the outer end of the spring and provided on opposite sides with eyes $k$, stud bolts L secured at their inner ends to the head B and arranged at their outer ends in said eyes, and screw nuts $l$, $l^1$ applied to each of said bolts and bearing against the inner and outer sides of each of said eyes. By adjusting the nuts $l$, $l^1$, the tension of the spring J may be regulated to produce the required endwise pressure of the plug against the seat of the casing for forming a tight joint between the same and automatically taking up any wear between the same. The pinion is preferably made wider than the gear wheel so as to permit of the requisite longitudinal movement of the gear wheel with the valve plug while taking up wear and still insure a full driving contact between the pinion and gear wheel.

Extending diametrically through the valve plug in line with the inlet and outlet of the casing is a cylindrical chamber, opening or port M of substantially the same diameter as said inlet and outlet. Within this chamber a hollow cylindrical piston or plunger $m$ reciprocates transversely to the axis of rotation of the valve plug. The latter is shorter than the length of the chamber and has its ends rounded and beveled so that when the same is moved to its extreme position in either direction one end of the piston will be flush with the corresponding side of the plug while its other end will be drawn inwardly from the other side of the plug and form a cavity in the latter.

The means for effecting the reciprocating movement of the piston in the plug are constructed as follows:

N represents a stationary arbor arranged axially relatively to the valve seat and plug and secured at its outer end in a hub $n$ of the fixed head of the casing by a set screw $n^1$ while its inner end projects inwardly through openings $o$, $o^1$ in the small end of the plug and the corresponding side of the piston. Within the piston the arbor is provided with a laterally projecting cam P which engages on its opposite sides with parallel guide ways or faces $q$, $q^1$ arranged transversely on the inner side of the piston. This cam is preferably formed integrally with the arbor and provided on its lowest and highest parts with concentric faces $p$, $p^1$ and between opposite ends of the concentric faces with cam faces $p^2$, $p^3$. The position of the faces of the cam relative to the casing is preferably such that the front end of the low face and the front end of the high face are in line with the axis of the inlet and outlet of the casing while the rear end of the low face and the rear end of the high face are arranged on a line at right angles to the axis of the inlet and outlet of the casing. This form of cam causes the piston upon being turned with the plug about the axis of the latter to be also reciprocated transversely in the chamber thereof so that its opposite ends alternately are flush with the respective side of the plug or are retracted inwardly from the same and form a pocket in the respective end of the chamber in the plug. This retraction of the piston in each end of the plug chamber begins when the front or advancing side of each end of the chamber is adjacent to the front side of the inlet of the casing and when this end of the chamber is axially in line with the inlet,—the piston is moved downwardly to its fullest extent, as shown in Fig. 1, whereby a cavity of the maximum size is formed in the upper end of the plug chamber and the lower end of the chamber is completely obstructed by the piston. The latter remains in this position during the continued forward rotation of the plug, the direction of which is indicated by the arrow in Fig. 1, until the axis of the chamber and piston is at right angles to the axis of the inlet and outlet, as shown in Fig. 4. While the cavity in the upper side of the plug thus passes the inlet, the material passes through the latter into this cavity and fills the same. Upon continuing the rotation of the plug in this direction the piston is moved transversely in the opposite direction in the plug by the cam and completes this movement when the rear edge of the respective end of the plug chamber is adjacent to the rear edge of the outlet of the casing, whereby the material is ejected by the piston from the respective end of the piston chamber into the outlet of the casing while passing the same.

While the material is being discharged from the lower end of the plug chamber by the piston the upper end of this chamber is vacated by the piston and material is entering the same preparatory to being discharged therefrom when the said end of the chamber reaches the underside of the plug. In this manner the material is admitted and discharged from both ends of the chamber successively.

The front and rear heads of the casing are provided at the bottom of the valve seat, with openings $r$, $s$ to permit of draining oil and destroying any vacuum which may be created at opposite ends of the valve seat due to leakage around the valve plug. These openings are normally closed by screw plugs $r^1$, $s^1$, as shown in Fig. 3. In its operation this valve is very efficient and its construction is simple, cheap and not liable to get out of order.

I claim as my invention:—

1. A valve comprising a casing having a valve seat and an inlet and an outlet, a plug rotatable in said seat and having a chamber or pocket extending transversely through the same, a piston reciprocating in said chamber or pocket, and a stationary cam having concentric and eccentric faces which engage with the piston and whereby the latter during part of the rotation of the plug is moved transversely in the plug while during another part of the rotation of the plug the piston is held against transverse movement therein, substantially as set forth.

2. A valve comprising a casing having a valve seat and an inlet and an outlet, a plug rotatable in said seat and having a pocket, a piston reciprocating in said pocket, and a cam device for actuating said piston, substantially as set forth.

3. A valve comprising a casing having a valve seat and an inlet and an outlet, a plug rotatable in said seat and having a pocket, a piston reciprocating in said pocket, and means for actuating said piston having a cam engaging with the piston, substantially as set forth.

4. A valve comprising a casing having a valve seat and an inlet and an outlet, a plug rotatable in said seat and having a chamber extending diametrically through said plug, a hollow piston reciprocating in said chamber, and a stationary cam supported on the casing and engaging with the inner side of said piston, substantially as set forth.

5. A valve comprising a casing having a valve seat and an inlet and an outlet, a plug rotatable in said seat and having a chamber extending diametrically through said plug, a hollow piston reciprocating in said chamber and provided on its inner side with two parallel transverse faces or ways, a stationary arbor mounted on said casing and projecting through the plug and piston into the interior of the latter, and a stationary cam arranged on the arbor and engaging on opposite sides of its periphery with the bearing faces on said piston, substantially as set forth.

Witness my hand this 3rd day of September, 1907.

OLIVER S. SLEEPER.

Witnesses:
THEO. L. POPP,
ANNA HEIGIS.